(12) United States Patent
Peck

(10) Patent No.: US 7,866,606 B2
(45) Date of Patent: Jan. 11, 2011

(54) AIRCRAFT CRASHWORTHY ENERGY ABSORBER SYSTEM

(75) Inventor: Walter Richard Peck, Asheville, NC (US)

(73) Assignee: LME, Inc., Arden, NC (US)

( * ) Notice: Subject to any disclaimer, the term of this patent is extended or adjusted under 35 U.S.C. 154(b) by 825 days.

(21) Appl. No.: 11/206,114

(22) Filed: Aug. 18, 2005

(65) Prior Publication Data

US 2007/0051850 A1 Mar. 8, 2007

(51) Int. Cl.
*B64D 25/04* (2006.01)
*B60N 2/427* (2006.01)

(52) U.S. Cl. .............................. 244/122 R; 297/216.13

(58) Field of Classification Search .................. 244/121, 244/122 R, 118.5, 141, 1 R, 138 R; 297/216.1, 297/216.13, 216.17, 452.63; 248/548; 280/805; 188/284, 286, 287, 289, 288, 376, 280
See application file for complete search history.

(56) References Cited

U.S. PATENT DOCUMENTS

| | | | | |
|---|---|---|---|---|
| 3,563,498 | A * | 2/1971 | Haile | 244/122 R |
| 4,150,805 | A * | 4/1979 | Mazelsky | 244/122 R |
| 4,408,738 | A * | 10/1983 | Mazelsky | 244/122 R |
| 4,655,416 | A * | 4/1987 | Carnell et al. | 244/121 |
| 5,558,301 | A * | 9/1996 | Kerdoncuff et al. | 244/122 R |
| 6,237,889 | B1 * | 5/2001 | Bischoff | 248/622 |
| 6,964,451 | B1 * | 11/2005 | Bergey | 297/216.1 |
| 2006/0011781 | A1 * | 1/2006 | Knoll et al. | 244/122 R |
| 2007/0096513 | A1 * | 5/2007 | Jones et al. | 297/216.1 |

* cited by examiner

*Primary Examiner*—Timothy D Collins
*Assistant Examiner*—Brian M O'Hara
(74) *Attorney, Agent, or Firm*—Foley & Lardner LLP

(57) ABSTRACT

An energy absorber system for aircraft survivability. The energy absorber system includes energy absorbers providing energy absorption in a plurality of occupant weight ranges, said system providing a controlled range of dynamic response index (DRI) and of lumbar load level in one of said occupant weight ranges and greater energy absorption stroke distance in one of said occupant weight ranges as the occupant weight increases toward its maximum value for the weight range.

31 Claims, 5 Drawing Sheets

Fig. 4

| EA STROKES INCHES | LOW EA FORCE POUNDS | MID RANGE EA FORCE POUNDS | HIGH RANGE EA FORCE POUNDS |
|---|---|---|---|
| 0 - 0.1 | 2550 | 3150 | 3550 |
| 0.1 - 3.75 | 2100 | 2655 | 2990 |
| 4.0 - 7.75 | 2600 | 3200 | 3580 |
| 8.0 - 10.5 | 3120 | 3860 | 4315 |
| 10.75 - 12.2 | 3350 | 4140 | 4675 |
| 12.45 - 16.0 | 3590 | 4380 | 4915 |

Note: Initial 0.1 Inch Stroke Force Provided By Shear Pin(s)

LOW WEIGHT RANGE

| | | | | | |
|---|---|---|---|---|---|
| SUP. WEIGHT (LB) | 93 | 102 | 116 | 120 | 133 |
| EA STROKE (IN) | 9.9 | 10.9 | 12.2 | 12.6 | 13.8 |
| MAX. LUMBAR G | 19.2 | 18.9 | 18.8 | 19.1 | 18.9 |
| MAX. DRI | 18.2 | 18.0 | 17.9 | 18.0 | 18.0 |

MID WEIGHT RANGE

| | | | | |
|---|---|---|---|---|
| SUP. WEIGHT (LB) | 129 | 138 | 148 | 155 |
| EA STROKE (IN) | 9.9 | 10.7 | 11.4 | 11.9 |
| MAX. LUMBAR G | 19.3 | 18.9 | 19.3 | 19.2 |
| MAX. DRI | 18.2 | 18.0 | 18.1 | 18.1 |

HIGH WEIGHT RANGE

| | | | | |
|---|---|---|---|---|
| SUP. WEIGHT (LB) | 151 | 160 | 170 | 180.5 |
| EA STROKE (IN) | 9.9 | 10.5 | 11.2 | 11.9 |
| MAX. LUMBAR G | 19.4 | 18.9 | 19.4 | 19.3 |
| MAX. DRI | 18.2 | 18.0 | 18.2 | 18.2 |

AIRCRAFT CRASHWORTHY ENERGY ABSORBER SYSTEM

BACKGROUND OF THE INVENTION

The invention relates to methods and apparatus for controlling injuries and the probability of injury in survivable crashes of aircraft, particularly helicopters.

Maintaining an acceptably low probability of spinal injury in a survivable aircraft crash is an important goal. This is particularly true for helicopters operated by the military. Achieving this goal is influenced by a number of factors, including the size of the seat occupant. In recent years, the range of sizes of seat occupants has widened because the pilot population has become more diverse. For example, females are generally smaller than their male counterparts. As females entered the military pilot population, the minimum seat pan supported weight which required an acceptable spinal injury probability during a survivable helicopter crash was appreciably reduced. At the same time, the maximum weight of the pilot population also rose appreciably. As a result, the ratio between the minimum weight pilot who should be provided acceptable spinal accelerations during the energy absorber stroke and the maximum weight pilot who should be provided acceptable energy absorption stroke distance has been drastically increased.

For many years the need for protecting the spine of the crewmembers in aircraft, particularly in vertical takeoff/landing aircraft, has been recognized. Crashworthy energy-absorbing seats were developed which used fixed level energy absorbers (FLEA) to provide spinal protection to the pilot and copilot of these types of aircraft in use by the United States Armed Services and first went into use in the 1970's. At that time only male pilots were flying in those aircraft and would use these crashworthy energy-absorbing seats. As a result the FLEAs designed for these seats were suitable for only a limited range of pilot weights. The force level provided by these FLEAs was set to provide the average weight male pilot (50th-percentile) during a crash event with a controlled deceleration of about 14 G, i.e., 14 times the acceleration of earth gravity. These crashworthy energy-absorbing seats were to provide a nominal 14 inches of travel of the seat pan, which supports the seat occupant during the energy absorber stroke, before the seat would contact the cockpit floor.

However, in a crash event a smaller seat occupant (having a lower weight) will experience a higher deceleration during the FLEA stroke. This will result in a higher probability of spinal injury. Further, in a crash event a larger seat occupant (having a higher weight) would experience a smaller deceleration with a resulting larger travel during the FLEA stroke. Since this larger seat occupant would be expected to have adjusted the seat pan downward from its nominal position to have proper eye level in the cockpit, this larger travel of the FLEA would probably result in the seat pan impacting the cockpit floor with enough residual velocity to severely injure the spine of the heavier seat occupant.

SUMMARY OF THE INVENTION

According to one aspect of the invention, there is provided an energy absorber system for aircraft survivability. The energy absorber system comprises energy absorbers providing energy absorption in a plurality of occupant weight ranges, said system providing a controlled range of dynamic response index (DRI) and of lumbar load level in one of said occupant weight ranges and greater energy absorption stroke distance in one of said occupant weight ranges as the occupant weight increases toward its maximum value for the weight range.

According to another aspect of the invention, there is provided an energy absorption system for protecting the spine of a seat occupant in aircraft crashes. The energy absorption system comprises an energy absorber attached to a seat frame, said energy absorber being active within an occupant weight range to provide a plurality of energy absorption force levels, said energy absorption force levels being applied at predetermined stroke distances.

BRIEF DESCRIPTION OF THE DRAWINGS

A multi-force level energy absorber operable over a plurality of weight ranges according to the invention will be described with reference to the drawings in which:

FIG. 4 illustrates tables listing parameters according to an exemplary five force level system according to an embodiment of the invention.

DETAILED DESCRIPTION OF THE PREFERRED EMBODIMENTS

Figure 1:
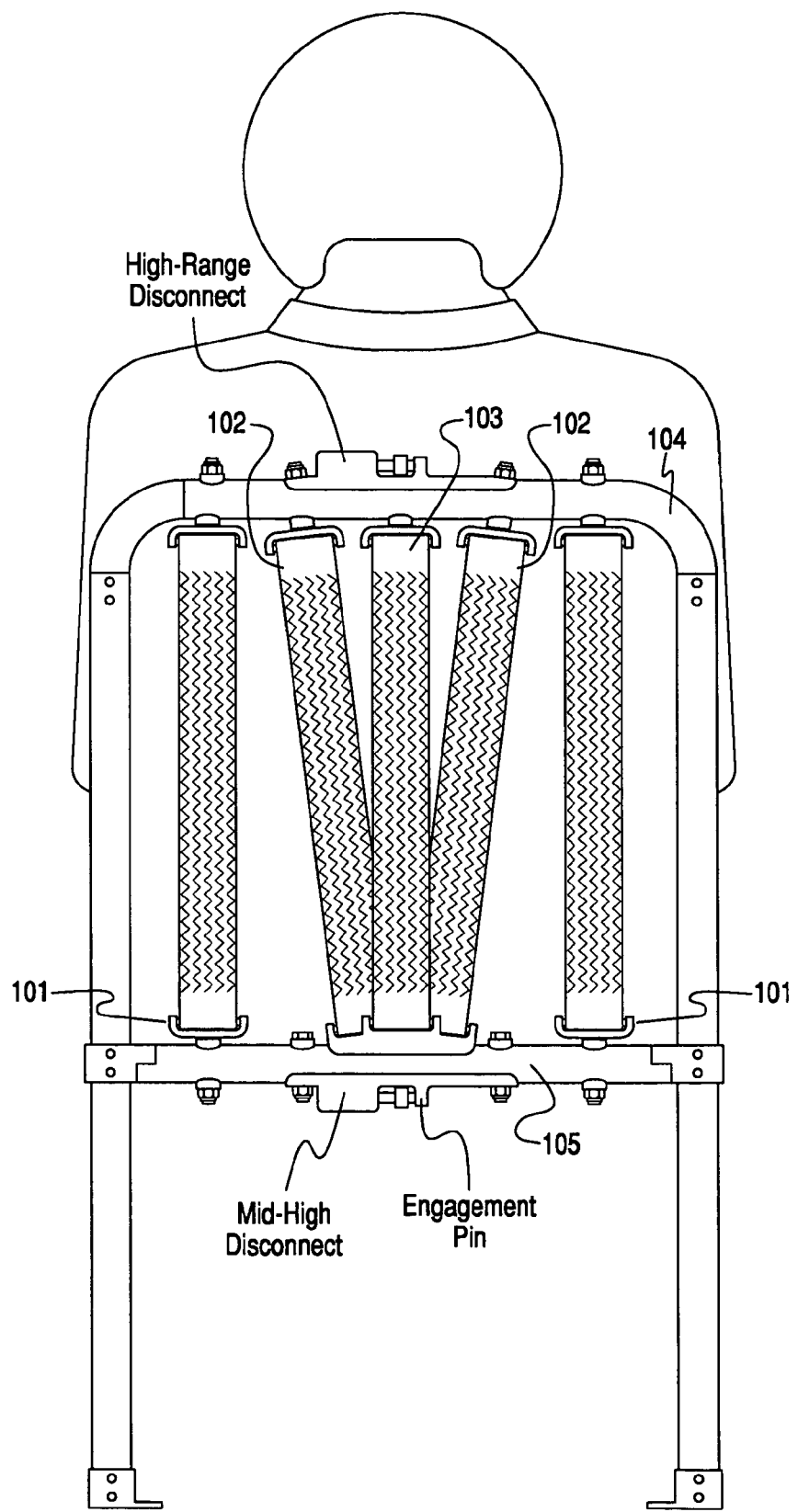
FIG. 1 illustrates an exemplary three weight range multi-force level energy absorber according to an embodiment of the invention.

By providing multiple energy absorption force levels over a plurality of weight ranges, the Energy Absorber System according to an embodiment of the invention provides very acceptable spinal acceleration levels, with resulting acceptable dynamic response index (DRI) values and very good lumbar load levels. It also provides very acceptable energy absorption stroke distances (for example, less than 14 inches in the low weight range, and 12 inches maximum in the mid and high weight ranges).

In the mid to late 1980's the second generation crashworthy energy absorber (EA) crew seat incorporating the manually adjustable variable-load EA (MAVLEA) was retrofitted into several helicopter models. The MAVLEA provided improved performance over that of the FLEA when it was correctly adjusted for the weight of the seat occupant. However, if it was incorrectly adjusted, or simply not adjusted, by the seat occupant its performance could be worse than that of the FLEA.

The spine of the human body can be acceptably represented by a spring/mass/damper system that has a natural frequency of 52.9 radians per second (8.42 Hertz) and a damping factor of 0.224. As such it will respond to a rapidly applied 14 G upward acceleration of the buttocks by the seat pan with a maximum compressive load equivalent to that of a very slowly applied upward acceleration of slightly over 20 G. Since this overshoot in the loading of the spine limited the maximum acceptable FLEA force that could safely be applied, it has been recognized that a notched EA profile would allow an appreciably higher average force through the EA stroke and would provide a greater average acceleration through the EA stroke. The initial spike in force level followed by the lower notch force level would allow the spine to reach a desired maximum compression level. This desired maximum compression level was about that which a very slowly applied 18 G acceleration level would produce. At that time the higher hold force level would maintain this desired maximum spinal loading to provide a maximum safe velocity change of the weight being supported by the EA.

Two methods of evaluating the spinal injury probability have been used to verify the acceptability of any acceleration versus time history. The first of these is known as the DRI. This DRI method uses a single degree of freedom spring/mass/damper model of the spine to determine the maximum loading of the spring representing the spine that the acceleration versus time history causes. It has been well documented by means of ejection seat data that a DRI of 18 has a five percent probability of injury. The second method is the lumbar load based upon the upward acceleration of the body weight supported by the L5 vertebra. A 20.4 G acceleration of this L5 vertebra supported weight has been considered acceptable by those who use this lumbar load as the best measure of spinal injury possibility.

In the 1990's the third generation automatic EA system (AEAS) was studied. The most advanced version of this AEAS is the third modification of the variable profile EA (VPEA) system identified as the VPEA3A system. The variable profile of this system includes an initial Spike that is followed by the lower Notch Load that in turn is followed by the higher Hold Load. Automatic adjustment of both the initial Spike level and the Hold Load level is made based upon the seat occupant weight, but the Notch Load level is set for the small female crew member and is not changed for the heavier seat occupants. This constant Notch Load is inherent in the adjustable energy absorber as designed for the VPEA3A system. This low constant notch load resulted in longer than desired energy absorption stroke distances and longer than acceptable stroking times for all pilots heavier than the 50th-percentile male pilot in a 30 degrees nose-down attitude baseline crash condition.

Approximate percentile weights for male and female pilots can be found, for example, in Final Report, TR-97256A, for the "DEVELOPMENT OF AN AUTOMATIC ENERGY ABSORBER SYSTEM FOR CRASHWORTHY HELICOPTER SEATS". Since the Phase II system tests carried out in the Variable Profile Energy Absorber (VPEA) development program used the 60 pound UH-60 Blackhawk seat, a 60 pound seat was used in the evaluation studies of the exemplary three weight range five-force level energy absorption system.

Since the TR-97256A report identified the 5th-percentile female as the minimum weight seat occupant and the 95th-percentile male as the maximum weight seat occupant, these weights were used as the minimum and maximum seat occupant weights in the evaluation studies performed of the exemplary three weight range five-force level energy absorption system described herein.

In the studies reported in TR-97256A the Seat Occupant Model-Light Aircraft (SOM-LA) program was used to evaluate the performance of the different energy absorbing systems. The SOM-LA program allows motion in two axes. In the inventor's study of the exemplary three weight range five-force level energy absorber system a single-axis computer program was used to model the energy absorption seat and its occupant. In the use of this single-axis program the seat pan and the seat occupant are oriented so as to have the appropriate input cockpit floor acceleration acting directly along the spine. The worst case baseline crash event where the acceleration was acting directly along the spine with an aircraft having 13 degrees nose-down attitude was represented. This aircraft attitude, which was used in the study of the exemplary three weight range five-force level energy absorber system, gave a 2.6 percent greater peak acceleration and total velocity change along the spine than the SOM-LA program modeled in the level flight attitude. Therefore this 13 degrees nose-down attitude is considered the worst case condition.

In the studies reported in TR-97256A the maximum allowable lumbar load in G's was determined using the 50th-percentile male pilot in the SOM-LA program with a DRI level of 18 as the upper limit to obtain a maximum lumbar provided upper torso acceptable acceleration level of 20.4 G. The TR-97256A report gives the lumbar supported weights for the 5th-percentile female, the 50th-percentile female, the 50th-percentile male, and the 95th-percentile male as 62.8 pounds, 78.9 pounds, 101.3 pounds, and 124.2 pounds respectively. In the inventor's study the upward accelerations of these lumbar supported weights were calculated.

The multi weight range/multi force level EA system of embodiments of this invention can provide superior performance to that of any of the previously developed EA systems. It is much simpler in operation than either the MAVLEA system or the VPEA3A system yet it will provide automatic adjustment of the force levels acting in the different weight ranges based upon the weight being supported by the seat pan. It may utilize stitch ripping EAs (SREAs) that can provide multiple force levels over accurately controlled distances, that are low in weight and very low in cost (see FIG. 1). The number of force levels can be easily controlled to as many different force level values as is desired. A special feature of the SREA is its ability to have both decreased and increased force levels as the EA stroke distance increases. This feature allows the lower weight seat occupants to have acceptable force levels through their shorter EA stroke distances while the heavier weight seat occupants can have desirable higher force levels at the end of their longer EA stroke distances.

The multi weight range capability of this EA system allows the total pilot population weight range from the 102.8 pound nude 5th-percentile female up to the 212 pound nude 95th-percentile male to be broken down into three, four or more much smaller weight ranges. For each of these smaller weight ranges the same force levels will be active throughout that weight range and will provide a low DRI value and a very good L5 acceleration level for the lightest seat occupant in that weight range, and will limit the EA stroke that the heaviest seat occupant in that weight range will experience to the maximum safe distance set for that weight range. Since the smaller seat occupants in the lower weight ranges will raise the seat pan to have the proper eye position, the allowable maximum EA stroke in these lower weight ranges can be increased. This in turn will allow both a reduction of the EA force levels and an increase in the largest seat occupant weight in that weight range. This is an important feature of the multi weight range/multi force level EA system that has not been provided in any other EA system.

According to embodiments of the invention, protection from injuries in a survivable crash is provided by an energy absorber that has multiple energy absorption forces in each of a plurality of weight ranges. By way of example and not limitation, the inventors studied and disclose herein a three weight range five-force level embodiment (3WR/5FL EA system). Those of ordinary skill will recognize that additional weight ranges and other numbers of force levels may be employed without departing from the scope of the invention.

The total pilot population used in the inventor's study of the 3WR/5FL EA system which is disclosed herein according to the invention ranged from the 5th-percentile female up to the 95th-percentile male. For this weight range the same seat supported weight of each seat occupant as was defined in the TR-97256A report was used in the inventor's study and ranged from 93.1 pounds (82.4 pounds supported body weight plus 10.9 pounds supported equipment weight) up to 180.5 pounds (169.6 pounds supported body weight plus 10.9 pounds supported equipment weight). The remainder of the total seat occupant weight which is made up primarily of the weight of boots, feet, lower legs, and some of the upper legs, is supported by the cockpit floor.

In the inventor's study of the 3WR/5FL EA system embodiment according to the invention, a seat weight of 60 pounds was added to these minimum and maximum seat occupant weights to give an EA supported weight range from 153.1 pounds up to 240.5 pounds.

Figure 2:
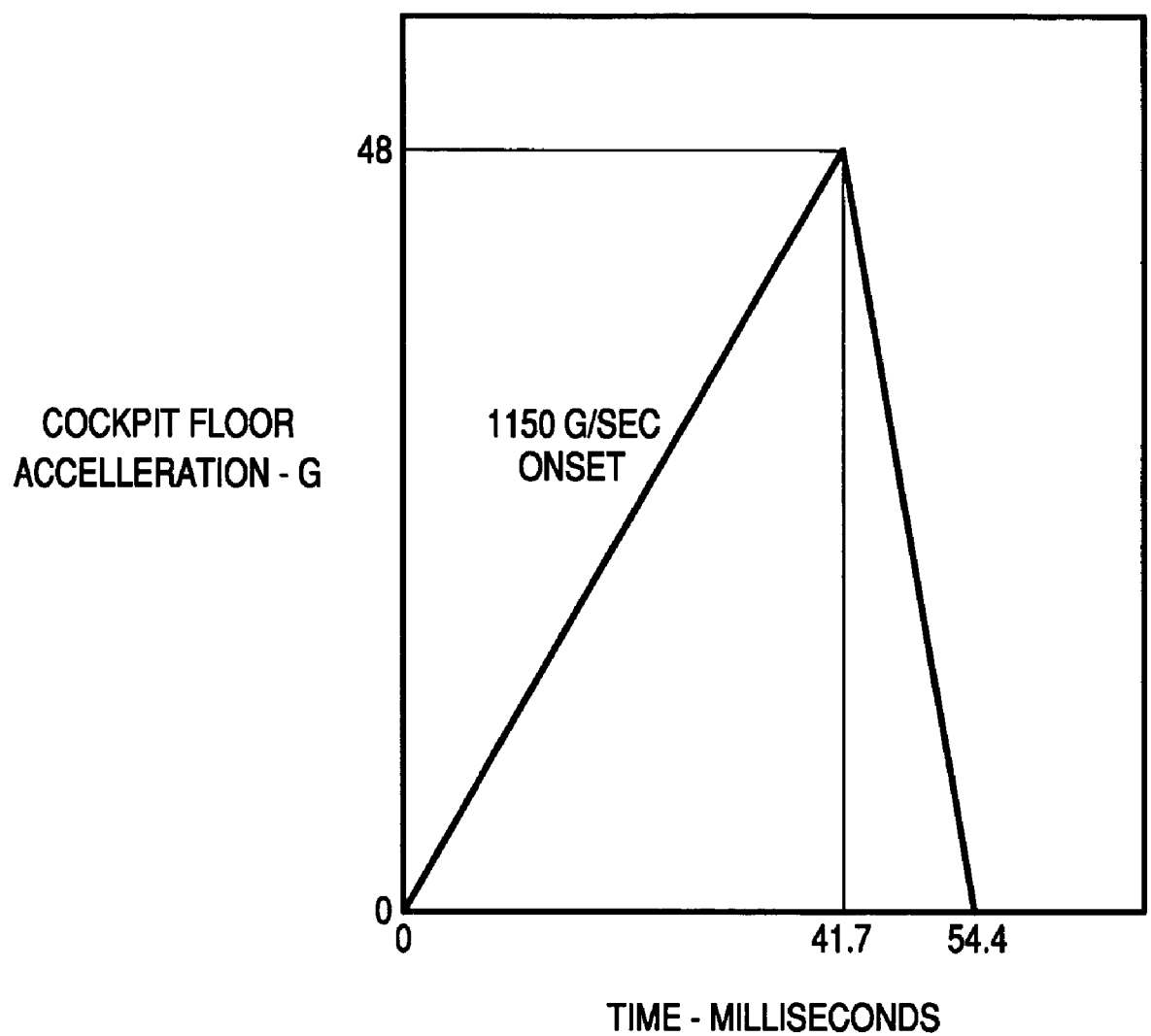
FIG. 2 is a graph illustrating a cockpit floor acceleration for a baseline severe vertical crash event that has been used to evaluate different energy absorbing system concepts and is used herein for that purpose.

FIG. 2 illustrates the baseline crash event used in the inventor's study. This baseline crash event has an acceleration rate-of-onset of 1150 G/second, a peak acceleration level of 48 G, and a total velocity change of 42 feet per second during the total crash event period of 54.4 milliseconds.

The exemplary 3WR/5FL EA system embodiment of the multi-force level EA system operable over a plurality of weight ranges according to the invention is broken into a low weight range, a mid weight range, and a high weight range. The low weight range made up of the smaller pilots in the total pilot population reached from the minimum seat supported weight of 93.1 pounds (EA supported weight of 153.1 pounds) up to its maximum seat supported weight of 133 pounds (EA supported weight of 193 pounds) for which the EA stroke ranged from 9.0 inches up to 13.8 inches. A maximum EA stroke of 13.8 inches was allowed since smaller pilots may have to adjust the seat upward to achieve the correct eye level position in the cockpit. The mid weight range made up of the more average size pilots of the total pilot population reached from a minimum seat supported weight of 129 pounds (EA supported weight of 189 pounds) up to its maximum seat supported weight of 155 pounds (EA supported weight of 215 pounds) for which the EA stroke ranged from 9.9 inches up to 11.9 inches. The high weight range made up of the larger size pilots of the total pilot population reached from a minimum seat supported weight of 151 pounds (EA supported weight of 211 pounds) up to its maximum seat supported weight of 180.5 pounds (EA supported weight of 240.5 pounds) for which the EA stroke ranged from 9.9 inches up to 11.9 inches.

In the 3WR/5FL EA system embodiment disclosed herein one design goal of the five force level values and of their individual stroke distances in each weight range was to have nearly the same DRI levels and nearly the same maximum G level of the lumbar supported weight for all pilots throughout that weight range. As used herein the term stroke distance refers to the elongation of the energy absorption mechanism. In each weight range the heaviest pilot in that weight range will have the largest EA stroke which results in the largest downward travel of the seat pan toward the cockpit floor. In the low weight range this largest downward seat travel can be 13.9 inches since these small seat occupants will have adjusted the seat upwards 1.9 or more inches to achieve the desired eye level in the cockpit. In the mid and high weight ranges this largest downward travel of the seat pan may be limited to twelve inches which is the minimum seat pan to cockpit floor spacing when the seat is adjusted full down.

Since the human spine can be represented by a spring/mass/damper system as the human spine is compressed in any crash event the actual instantaneous weight supported by each lumbar vertebra will increase from its initial value up to a larger final value approximately linearly with the spinal compression. The 3WR/5FL EA embodiment disclosed herein, in addition to the five force levels provided by the low, mid, and high weight range energy absorbers, will provide three initial high force levels for each of these three weight ranges. These three initial high force levels for the low, mid, and high weight ranges may be provided by different means within the scope of this invention. One simple means could be a single row of stitching that is sewn perpendicular to the energy absorbing stitch ripping rows in which all the threads will fail at the same time so as to provide the desired high force that upon this thread failure will allow the SREA rows to then provide the desired notch force levels and the subsequent higher hold force levels for the three weight ranges. Another means that could be preferred in some models of crash worthy energy absorbing seats, would be by means of three pairs of rods each with shear pins arranged so as to provide the desired initial high force levels in each of the three weight ranges. These rods would be parallel with the SREAs and would securely support the seat pan at all times prior to a crash event in each of the three weight ranges. Each of these rods would incorporate a shear pin that would be appropriately engaged (activated) or disengaged for the sensed seat pan weight by the same mechanisms which engage or disengage the mid and high weight range EAs. Until the active shear pins, which would be designed to provide the desired initial force level for the selected weight range, have sheared, no force will be applied to the active energy absorbers. Thus the seat occupant's spine in any crash event will have been compressed to a desired level, by one of the above means or other means, before any force is applied to the active energy absorbers. As the spine continues to compress under the dynamics of the increasing upward acceleration of the cockpit floor the effective instantaneous weight being supported by the now loaded energy absorbers also increases.

The energy absorption mechanism elongates only after the upward acceleration of the cockpit floor multiplied by the instantaneous EA supported weight has been sufficient to shear the low, mid, or high weight range shear pins and will continue to elongate until the downward velocity of the seat pan relative to the cockpit floor has been arrested. In the baseline crash event the downward velocity of the cockpit floor will have been arrested in 54.4 milliseconds. In the 3WR/5FL EA embodiment disclosed herein the elongating energy absorbers will continue to elongate from 37 milliseconds up to as much as 49 milliseconds longer. As the energy absorbers elongate their active force levels applied to the seat pan accelerate it and the base of the seat occupant's spine upward. By elongating at accurately controlled force levels, and thus at controlled acceleration levels, the energy absorption mechanism reduces the compressive force experienced by the spine of the seat occupant, thereby reducing the probability of spinal injury. The distance the energy absorption mechanism elongates depends upon the weight range active, the weight of the seat occupant, and the circumstances of the crash event. According to the invention, the energy absorber force levels increase as the stroke distance increases. In the 3WR/5FL EA embodiment illustrated herein, selected energy absorbers are engaged for each weight range. Within each weight range, the force levels provided by the active energy absorbers increase in a stair step function from an initial lower force level through four higher force levels as a function of the energy absorber stroke distance. Those of ordinary skill will recognize that any number of such force levels can be employed or that the relationship between the stroke distance and the energy absorber force could be continuous, rather than a fixed level relationship within the scope of the invention. Thus, a method and apparatus according to the invention includes a multi-weight range, multi-force level configuration or a continuous force versus stroke relationship system.

As shown in FIG. 1, seat 100 has energy absorbers (EA) 101, 102, 103, connected to seat frame assembly 104 and seat bucket beam 105. In the 3WR/5FL exemplary embodiment of a multi-weight range, multi-force level energy absorber system as shown herein, EAs 101 are active in the low weight range, EAs 101 and 102 are active in the mid weight range, and EAs 101,102 and 103 are all active in the high weight range.

According to the 3WR/5FL embodiment of a method and apparatus according to the invention shown herein acting in each of the three weight ranges provide five force levels through the total EA stroke. The shear pins initially, and the energy absorber force levels later, are designed to provide the desired maximum acceleration level to the minimum seat supported weight with its minimum stroke distance in each of these three weight ranges. Since the effective weight being accelerated by the active energy absorbers forces increases as the spine is compressed, it is desired to increase the active energy absorbers force level to maintain a desired seat pan acceleration level so as to maintain the DRI level as well as the acceleration level of the fifth lumbar vertebra (L5 vertebra) supported weight to their desired maximum levels. Since the heavier seat occupants will more quickly stroke further into the higher force levels of the energy absorbers in each of the three weight ranges, by controlling the force level values as well as by controlling the stroke distances at which the higher force levels become active, it is possible to have near maximum desired DRI levels and near maximum desired acceleration levels of the fifth lumbar vertebra (L5 vertebra) supported weight throughout the seat occupant weight range in each of the three weight ranges. Since the EAs 101 and 102 are both active in the mid weight range, and since all three EAs are active in the high weight range, the same stroke distance for initiating the increased force levels may be maintained in the three EAs 101, 102 and 103.

Figure 3:
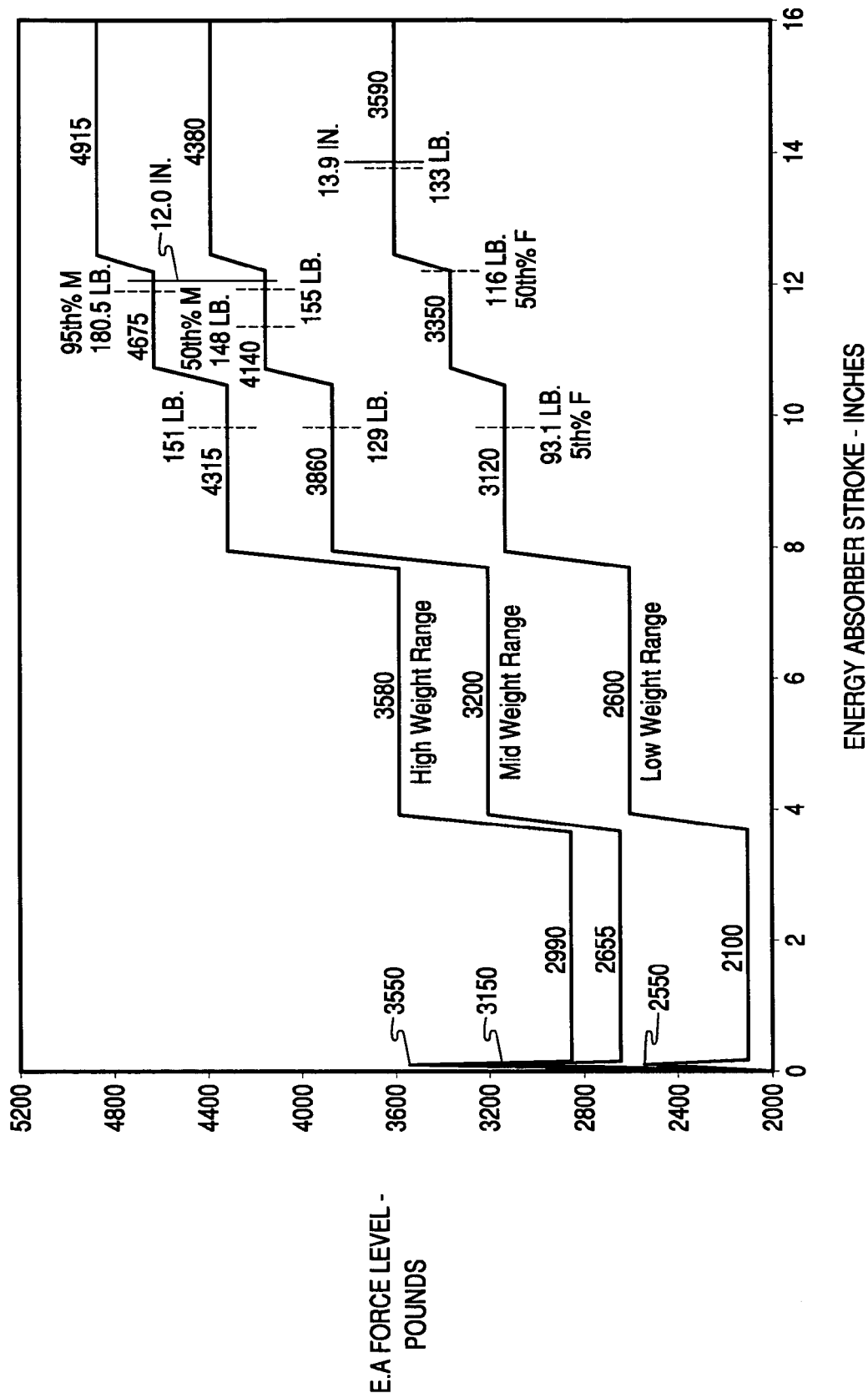
FIG. 3 is a graph illustrating the relationship between the five force levels and the stroke distances for an exemplary three weight range five-force level energy absorber system in the low, mid, and high weight ranges for the baseline crash event.

FIG. 3 illustrates operation of the 3WR/5FL embodiment of a multi-force level energy absorber operating over a plurality of seat pan supported weights throughout the three weight ranges according to an exemplary embodiment of the invention for the baseline crash event. Those of ordinary skill will recognize that larger numbers of weight ranges and larger numbers of force levels are within the scope of the invention. FIG. 3 shows the shear pin force levels and the energy absorber 101 low weight range five force levels, the energy absorbers 101 and 102 mid weight range five force levels, and the energy absorbers 101, 102, and 103 high weight range five force levels, as a function of the seat pan movement relative to the cockpit floor for each of the three weight ranges according to the invention. FIG. 3 illustrates the minimum and maximum stroke distances and peak force levels for the minimum and maximum seat pan supported weights of the exemplary three weight range five-force level energy absorber system in the baseline crash event. The stroke distances and maximum force levels that the 50th-percentile female and 50th-percentile male seat occupants would experience are also provided in FIG. 3.

According to the invention, by way of illustration and not limitation, the mechanism utilized to provide easily produced EAs with the desired multiple force levels over accurately controlled distances is stitch ripping or tearing of appropriate threads/cords in standard webbing. The force level is controlled by the size and strength of the thread used to form the stitches, by the number of rows of stitches, and by the number of stitches per inch in a row. For example, with standard 8000 pound webbing, 40 pound nylon number six cord could be used. The EA ripping force can be increased appreciably by increasing the number stitches in one or more rows. The EA ripping force can also be increased by adding rows of stitching. Those of ordinary skill will recognize that by employing various combinations of thread/cord strength, rows of stitching and numbers of stitches per inch per row, one can achieve any desired EA force level.

The EA according to the invention has several advantages beyond the easily controlled force levels over the desired distances. The production costs in large numbers are extremely cost effective. The total system weight is lighter than comparable EA systems of less capability. The EA stroke provided is longer than the initial length of the stitch ripping EA due to its two-to-one ratio of ripped length to unripped length. The comfort factor and space requirements are considered important desirable features of this type of EA mechanism.

The control of the mid and high EAs 102 and 103 of the exemplary 3WR/5FL EA system described herein, is simple and reliable as compared to that of either the acceleration-sensing automatic-variable-load energy absorber (ASAV-LEA) or the VPEA. Redundant weight sensing switches, or other measurement devices, are provided for each of the EA supported weight range crossover points, i.e. 191 pounds and 213 pounds (131 and 153 pounds+60 pounds). A solenoid operated pin 106, or other suitable device causes the mid weight range EAs 102 to be active whenever 191 pounds or heavier EA supported weights are sensed. Another solenoid operated pin 107, or suitable device, causes the high weight range EAs 103 to be active whenever 213 pounds or heavier EA supported weights are sensed. This system according to the invention, while being more effective, is far less expensive, less complicated, more easily maintained, lower weight, and occupies appreciably less space than a system with automatically adjusted EAs.

One of ordinary skill will recognize that in those seats which have an EA supported seat weight of only 15 pounds, the ratio between the maximum occupant weight plus seat weight (195.5 pounds) and the minimum occupant weight plus seat weight (108.1 pounds) is appreciably greater than that for seats which have an EA supported seat weight of 60 pounds (240.5 pounds to 153.1 pounds). Thus, the invention can be expanded to four or more weight ranges, and to six or more EA force levels to accommodate such light weight seats.

FIG. 3 depicts graphically the initially optimized: three weight range shear pin values; three weight range EA five force levels and their stroke distances for the exemplary 3WR/5FL EA system with its 60 pound EA supported seat weight. The maximum EA stroke for the minimum and maximum possible seat pan supported occupant weights (assuming a ±2 pound tolerance on the weight sensing means used) in the three weight ranges are indicated. FIG. 4 provides a tabular listing of this EA force and maximum stroke data plus the maximum DRI levels and maximum upper occupant accelerations for lumbar load evaluations for these same minimum and maximum possible seat pan supported occupant weights as well as for other intermediate seat pan supported weights. FIG. 4 identifies the initial shear pin force level, the subsequent five energy absorber force levels, the start and stop stroke distances for the five energy absorber force levels for the three weight ranges of this exemplary multi-weight range, multi-force level energy absorber system that result from the baseline crash event (See FIG. 2). FIG. 4 also lists the maximum energy absorber stroke distances, the maximum lumbar L5 vertebra acceleration in G's, and the maximum DRI levels that different seat pan supported weight occupants would experience in the baseline crash event.

Other configurations can also be constructed within the scope of this invention. A 4WR/5FL EA system would require some complexity over the 3WR/5FL EA system to maintain the minimum EA stroke distance with acceptable DRI levels and lumbar loads in lighter weight seats throughout the total male and female aviator population. Even if a 4WR/5FL EA system, or a more complicated system, were required to meet a specific set of requirements, by using the same basic system design concepts of the 3WR/5FL EA system, this more capable 4WR/5FL EA system would be simpler and more reliable than any other advanced EA system. Moreover, it is believed that a multi-weight range, multi-force level EA system within the scope of this invention can provide acceptable performance throughout the total male and female aviator population in any light weight EA seat.

The 4WR/5FL embodiment would use stitch ripping in, for example, 2.0 inch webbings mounted to the seat frame, as previously discussed herein for a 3WR/5FL embodiment. In this case 4 pairs of stitch ripping webbing EAs may be used, for example. One stitch ripping webbing of each pair would be located on the right side of the seat and the other of each pair would be on the left side of the seat. The four weight ranges of a 4WR/5FL EA system may be identified, in order, as the low, low-mid, high-mid, and high weight range. Five EA pairs, 1-5, may be used, for example. EA pairs 1 and 2 would be active in all four weight ranges, providing the appropriate five force levels for the low weight range. EA pair 3 would be active only in the upper three weight ranges, i.e. the low-mid, high-mid and high weight ranges and with pairs 1 and 2 would provide the five force levels for the low-mid weight range. EA pair 4 would be active only in the upper two weight ranges, i.e. the high-mid and high weight ranges and with pairs 1, 2 and 3 would provide the five force levels for the himid weight range. EA pair 5 would be active only in the high weight range and with pairs 1, 2, 3 and 4 would provide the five force levels for the high weight range. Redundant weight range switches, or other weight sensing means, and solenoids, or other EA pair activating means, could be used as previously discussed herein for the 3WR/5FL embodiment.

Figure 5:
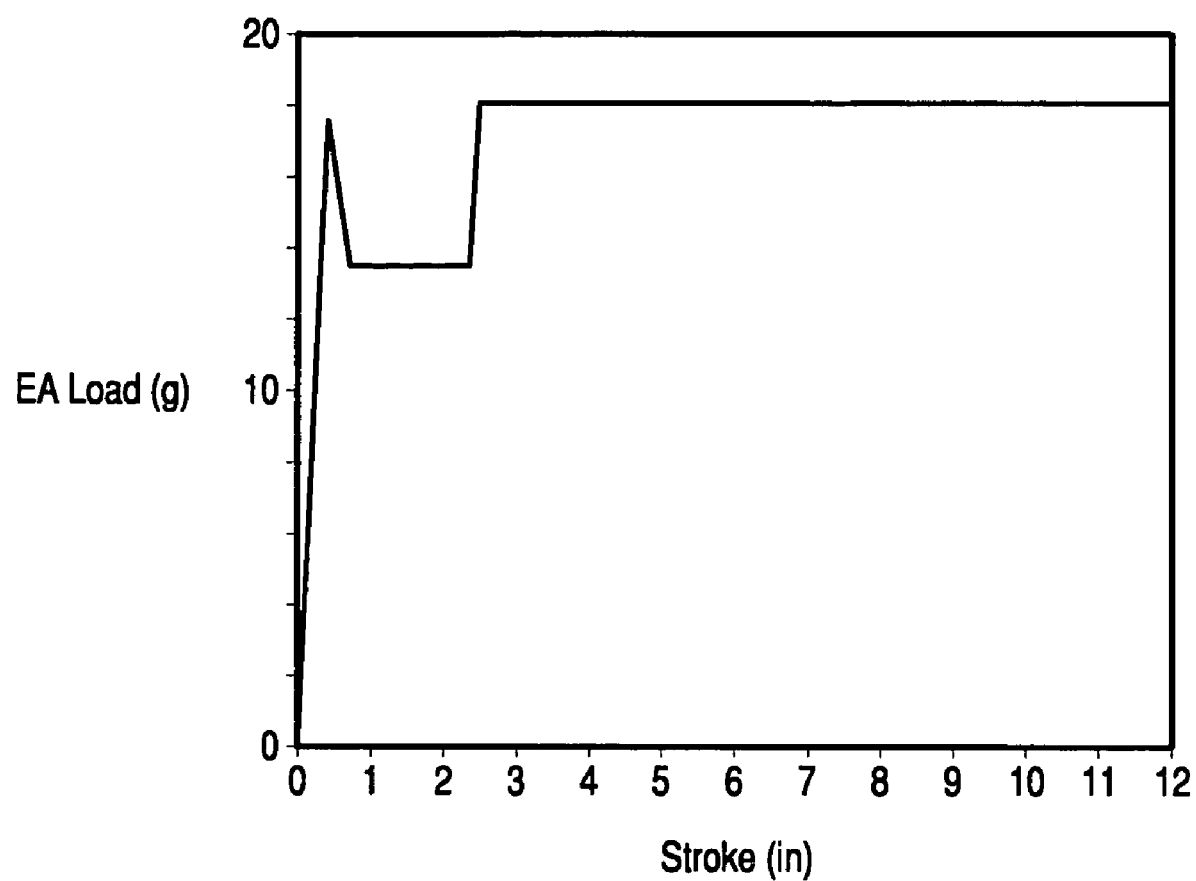
FIG. 5 illustrates a notched energy absorber (EA) profile used in a preferred embodiment of the invention.

Another feature that can be employed according to the invention is the notch profile as shown in FIG. 5. This notch profile can be achieved by having shear pins in each of the EA pairs which must shear before any loads can be applied to the EAs themselves. In the notch profile, a high carefully controlled initial force level must be active in each weight range, provided by some means such as shear pins, that will provide a desired maximum level of spinal preloading to the smallest weight seat occupant in that weight range, before they disconnect. Once the upward acceleration of the aircraft acting on the mass of the seat pan and the seat occupant loads the EA system pairs that are active for the selected weight range at relatively low force level, the first of the five force levels in the exemplary 3WR/5FL EA embodiment, will be active. After the active EA pairs have stroked a short distance the EA force level will increase in steps until the downward motion of the seat pan relative to the cockpit floor has been stopped. Those of ordinary skill will understand that such short term initial loading of the human spine at a relatively high acceleration level with a subsequent loading at a lower acceleration level and then at a higher level is a preferred means of reducing any overshoot of the spinal loading that reduces appreciably the probability of spinal injury.

The initial (0-0.1 inches of EA stroke) high force level, short duration forces active in the exemplary 3WR/5FL EA system as depicted in FIG. 3 and listed in FIG. 4 are 2550 pounds, 3150 pounds and 3550 pounds in the low weight range, in the mid weight range and in the high weight range, respectively. The five EA force levels versus distance in the low, mid and high weight ranges of the exemplary 3WR/5FL EA system as depicted in FIG. 3 and listed in FIG. 4 are as follows.

Low Seat Pan Supported Weight Range

| EA Stroke (in.): | 0.1-3.75 | 4.0-7.75 | 8.0-10.5 | 10.75-12.2 | 12.45-16.0 |
|---|---|---|---|---|---|
| Force Level (lb.): | 2100 | 2600 | 3120 | 3350 | 3590 |

Mid Seat Pan Supported Weight Range

| EA Stroke (in.): | 0.1-3.75 | 4.0-7.75 | 8.0-10.5 | 10.75-12.2 | 12.45-16.0 |
|---|---|---|---|---|---|
| Force Level (lb.): | 2655 | 3200 | 3860 | 4140 | 4380 |

High Seat Pan Supported Weight Range

| EA Stroke (in.): | 0.1-3.75 | 4.0-7.75 | 8.0-10.5 | 10.75-12.2 | 12.45-16.0 |
|---|---|---|---|---|---|
| Force Level (lb.): | 2990 | 3580 | 4315 | 4675 | 4915 |

Table 1 below provides the lumbar load expressed in G, the DRI, the total EA stroke, and the EA end force for several seat occupants with varying seat pan supported weights throughout the low, mid, and high weight ranges of this exemplary 3WR/5FL EA system. The lumbar load, DRI, and total EA stroke are also illustrated in FIG. 4. As can be seen, this exemplary 3WR/5FL EA system provides superior performance.

example if the seat pan weight is reduced from sixty pounds down to twenty pounds, the ratio of the maximum EA supported weight of the 95th-percentile male to the minimum EA supported weight of the 5th-percentile female increases to 1.78 from its value of 1.59 for the sixty pound seat.

The system could also be a five weight range energy absorber system, for example, with weight ranges in the order or low-low, high-low, mid, low-high and high-high.

TABLE 1

| WEIGHT RANGE | SEAT PAN SUPPORTED WEIGHT POUNDS | MAX. UPPER OCCUPANT ACCEL. G | MAXIMUM DRI | EA STROKE DISTANCE INCHES | EA END FORCE POUNDS |
|---|---|---|---|---|---|
| LOW | 93[1] | 19.2 | 18.2 | 9.9 | 3120 |
|  | 102 | 18.9 | 18.0 | 10.9 | 3350 |
|  | 111 | 18.9 | 18.0 | 11.7 | 3350 |
|  | 116[2] | 18.8 | 17.9 | 12.2 | 3353 |
|  | 120 | 19.1 | 18.0 | 12.6 | 3590 |
|  | 133 | 18.9 | 18.0 | 13.8 | 3590 |
| MID | 129 | 19.3 | 18.2 | 9.9 | 3860 |
|  | 138 | 18.9 | 18.0 | 10.7 | 4028 |
|  | 148[3] | 19.3 | 18.1 | 11.4 | 4175 |
|  | 155 | 19.2 | 18.1 | 11.9 | 4175 |
| HIGH | 151 | 19.4 | 18.2 | 9.9 | 4315 |
|  | 160 | 18.9 | 18.0 | 10.5 | 4315 |
|  | 170 | 19.4 | 18.2 | 11.2 | 4675 |
|  | 180.5[4] | 19.3 | 18.2 | 11.9 | 4675 |

Notes:
[1] 5th-percentile Female
[2] 50th- percentile Female
[3] 50th- percentile Male
[4] 95th- percentile Male For the three weight range example above, the low weight range SREAs remain active in all three weight ranges, the mid weight range SREAs are active in the mid and high weight ranges, and the high weight range SREAs are active only in that high weight range. Simple weight sensing means may be activated when aircraft power is first turned on under the known 1 G earth gravity. Whenever the sensed EA supported weight is above the low to mid weight range crossover level, the mid weight range SREAs may be activated by some means, such as a sliding key lock for example. Likewise, whenever the sensed EA supported weight is above the mid to high weight range crossover level the high weight range SREAs may be activated by some means, such as a sliding key lock for example. These locking mechanisms may be operated by simple electrically powered solenoids or by stepper motor driven cams to provide assured selection of the correct SREAs for the weight range being sensed. Other means as appropriate can be used within the scope of this invention to operate the locking mechanisms of the higher weight range SREAs.

There are other weight range and force level configurations that can be constructed within the scope of this invention. Increasing the number of weight ranges to four or more will result in lower DRI levels and lower lumbar load levels for all seat pan supported weights throughout the total pilot population with a relatively small penalty of increased system complexity. The use of four or even more weight ranges will provide an important reduction to the maximum DRI level and the lumbar load level in those crashworthy seats wherein the weight of the EA supported seat pan is appreciably smaller than the sixty pounds used in the above example. For Those of ordinary skill will also recognize that stroke distances and EA force levels can also be adjusted to accommodate different seats with greater or smaller seat height adjustments above the cockpit floor.

Those of ordinary skill will recognize that other embodiments using other forms and component parts are within the scope of the invention in the appended claims.

What is claimed is:

1. An energy absorber system for aircraft survivability comprising a seat frame configured for a backrest of a seat, energy absorbers configured for attachment to the seat frame and providing energy absorption in a plurality of occupant weight ranges, said system providing a controlled range of dynamic response index (DRI) and of lumbar load level in one of said occupant weight ranges and greater energy absorption stroke distance in one of said occupant weight ranges as the occupant weight increases toward its maximum value for the weight range, said energy absorbers providing a plurality of energy absorption force levels throughout an energy absorption stroke, said energy absorbers providing an initial spike energy force level at about 0.1 inches of energy absorption stroke, and then after said initial spike energy force level, a plurality of increasing energy absorption force levels as the energy absorption stroke increases, the energy absorption force levels increasing monotonically over an entire remainder of the energy absorption stroke after said initial spike energy force level, thereby providing a desired maximum acceleration for any said supported weight throughout any of the said plurality of occupant weight ranges.

2. An energy absorption system as recited in claim 1, said system providing said controlled DRI, said controlled lumbar load level, and said greater energy absorption stroke distance as said occupant weight increases within a same one of said occupant weight ranges.

3. An energy absorption system as recited in claim 1, said system providing said controlled DRI, and said controlled lumbar load level, and said greater energy absorption stroke distance in each of said plurality of occupant weight ranges as said occupant weight increases.

4. An energy absorber system as recited in claim 1, said energy absorbers comprising a set of energy absorbers for each of said plurality of weight ranges, said set of energy absorbers in each of said weight ranges being activated by sensors sensing an energy absorber supported weight that is equal to or greater than a minimum weight value for a respective weight range.

5. An energy absorber system as recited in claim 4, said sets of energy absorbers in each of said plurality of weight ranges providing a maximum energy absorber stroke distance for said maximum weight supported in each of said weight ranges that is appropriate for that said weight range.

6. An energy absorber system as recited in claim 1, said energy absorbers providing about the same said controlled range of DRI and said controlled lumbar load level for a minimum weight supported in each of said plurality of weight ranges.

7. An energy absorber system as recited in claim 1, said energy absorbers maintaining a desired maximum DRI and a desired maximum lumbar load level at each energy absorption force level for any said supported weight throughout any of the said plurality of occupant weight ranges.

8. An energy absorber system as recited in claim 7, said system increasing said energy absorption force level at said energy absorption stroke distance to have said DRI and said lumbar load level of any supported weight throughout said plurality of weight ranges maintained just below or at their desired maximum levels.

9. An energy absorber system as recited in claim 8, wherein selected ones of said force levels limit said energy absorption stroke distance.

10. An energy absorber system as recited in claim 9, wherein said selected ones of said force levels limiting said energy absorption stroke distance provide predetermined acceleration levels to occupants in selected ones of said plurality of weight ranges.

11. An energy absorber system as recited in claim 10, wherein said energy absorber system is a three weight range energy absorber system, and said selected ones of said plurality of weight ranges are an occupant low weight range, an occupant mid weight range and an occupant high weight range.

12. An energy absorber system as recited in claim 11, selected ones of said energy absorbers are active as appropriate in said occupant low weight range, in said occupant mid weight range, and in said occupant high weight range of said three occupant weight ranges.

13. An energy absorber system as recited in claim 12, selected ones of said energy absorbers being active as appropriate in said mid weight range comprising said selected ones of said energy absorbers active in said low weight range and said selected ones of said energy absorbers active in said mid weight range.

14. An energy absorber system as recited in claim 12, selected ones of said energy absorbers being active as appropriate in said high weight range comprising said selected ones of said energy absorbers active in said low weight range, said selected ones of said energy absorbers active in said mid weight range, and said selected ones of said energy absorbers active in said high weight range.

15. An energy absorber system as recited in claim 10, wherein said energy absorber system is a four weight range energy absorber system, and said selected ones of said plurality of weight ranges are an occupant low weight range, an occupant low-mid weight range, an occupant high-mid weight range and an occupant high weight range.

16. An energy absorber system as recited in claim 15, selected ones of said energy absorbers are active as appropriate in said occupant low weight range, in said occupant low-mid weight range, in said occupant high-mid weight range and in said occupant high weight range of said four weight ranges.

17. An energy absorber system as recited in claim 16, selected ones of said energy absorbers being active as appropriate in said low-mid weight range comprising said selected ones of said energy absorbers active in said low weight range and said selected ones of said energy absorbers active in said low-mid weight range.

18. An energy absorber system as recited in claim 16, selected ones of said energy absorbers being active as appropriate in said high-mid weight range comprising said selected ones of said energy absorbers active in said low weight range, in said low-mid weight range, and said selected ones of said energy absorbers active in said high-mid weight range.

19. An energy absorber system as recited in claim 16, selected ones of said energy absorbers being active as appropriate in said high weight range comprising said selected ones of said energy absorbers active in said low weight range, in said low-mid weight range, in said high-mid weight range, and said selected ones of said energy absorbers active in said high weight range.

20. An energy absorber system as recited in claim 10, wherein said energy absorber system is a five weight range energy absorber system, and said selected ones of said plurality of weight ranges are an occupant low-low weight range, an occupant high-low weight range, an occupant mid weight range, an occupant low-high weight range and an occupant high-high weight range.

21. An energy absorber system as recited in claim 20, selected ones of said energy absorbers are active as appropriate in said occupant low-low weight range, in said occupant high-low weight range, in said occupant mid weight range, in said occupant low-high weight range, and in said occupant high-high weight range of said five weight ranges.

22. An energy absorber system as recited in claim 21, selected ones of said energy absorbers being active as appropriate in said high-low weight range comprising said selected ones of said energy absorbers active in said low-low weight range and said selected ones of said energy absorbers active in said high-low weight range.

23. An energy absorber system as recited in claim 21, selected ones of said energy absorbers being active as appropriate in said mid weight range comprising said selected ones of said energy absorbers active in said low-low weight range, in said high-low weight range, and said selected ones of said energy absorbers active in said mid weight range.

24. An energy absorber system as recited in claim 21, selected ones of said energy absorbers being active as appropriate in said low-high weight range comprising said selected ones of said energy absorbers active in said low-low weight range, in said high-low weight range, in said mid weight range, and said selected ones of said energy absorbers active in said low-high weight range.

25. An energy absorber system as recited in claim 21, selected ones of said energy absorbers being active as appropriate in said high-high weight range comprising said selected ones of said energy absorbers active in said low-low weight range, in said high-low weight range, in said mid weight range, in said low-high weight range, and said selected ones of said energy absorbers active in said high-high weight range.

26. An energy absorber system as recited in claim 1, said energy absorbers comprising webbing with stitching, said stitching ripping to provide energy absorption force levels over controlled distances.

27. An energy absorption system as recited in claim 21, said stitching having a number of rows of stitches corresponding to said energy absorption force levels.

28. An energy absorption system as recited in claim 27, said stitching composed of thread or cord of an appropriate strength corresponding to said energy absorption force levels.

29. An energy absorption system as recited in claim 28, said stitching comprising a number of stitches per inch in each row of stitches corresponding to said energy absorption force levels.

30. An energy absorption system for protecting the spine of a seat occupant in aircraft crashes comprising an energy absorber attached to a seat frame, said seat frame configured for a backrest of a seat, said energy absorber being active within an occupant weight range to provide a plurality of energy absorption force levels, said energy absorption force levels being applied at predetermined stroke distances, said energy absorption force levels in each weight range having an initial spike energy force level at about 0.1 inches of stroke distance, and then after said initial spike energy force level, being increased to higher levels as stroke distance increases, the energy absorption force levels increasing monotonically over an entire remainder of the energy absorption stroke after said initial spike energy force level.

31. An energy absorption system as recited in claim 30, comprising a plurality of energy absorbers, said energy absorbers being active according to said seat occupant's weight.

* * * * *